(12) United States Patent
Viswanathan

(10) Patent No.: US 10,915,914 B2
(45) Date of Patent: Feb. 9, 2021

(54) METHOD, APPARATUS, AND COMPUTER PROGRAM PRODUCT FOR INCENTIVIZING TRAVEL ALONG ROAD SEGMENTS

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 193 days.

(21) Appl. No.: 16/107,013

(22) Filed: Aug. 21, 2018

(65) Prior Publication Data
US 2020/0065842 A1 Feb. 27, 2020

(51) Int. Cl.
| G06Q 30/02 | (2012.01) |
| G01C 21/34 | (2006.01) |
| G06Q 50/30 | (2012.01) |
| G07C 5/00 | (2006.01) |
| G01C 21/32 | (2006.01) |
| G06F 16/29 | (2019.01) |

(52) U.S. Cl.
CPC ......... *G06Q 30/0208* (2013.01); *G01C 21/32* (2013.01); *G01C 21/3461* (2013.01); *G06F 16/29* (2019.01); *G06Q 50/30* (2013.01); *G07C 5/008* (2013.01)

(58) Field of Classification Search
CPC .................................................... G06Q 30/02
See application file for complete search history.

(56) References Cited

U.S. PATENT DOCUMENTS

| 8,121,780 | B2 | 2/2012 | Gerdes et al. |
| 9,792,814 | B2 | 10/2017 | Glasgow et al. |
| 10,248,913 | B1* | 4/2019 | Gururajan ............... G06Q 50/30 |
| 2006/0129313 | A1* | 6/2006 | Becker ............. G08G 1/096822 |
| | | | 701/533 |
| 2011/0208646 | A1 | 8/2011 | McMaster et al. |

(Continued)

OTHER PUBLICATIONS

Guzolek, J.; Koch, E; Real-time route planning in road networks (English), Conference Record of papers presented at the First Vehicle Navigation and Information Systems Conference (VNIS '89) (pp. 165-169), Jan. 1, 1989 (Year: 1989).*

(Continued)

*Primary Examiner* — Marilyn G Macasiano
(74) *Attorney, Agent, or Firm* — Alston & Bird LLP

(57) ABSTRACT

A method, apparatus and computer program product are provided to incentivize travel along specific road segments. Methods may include: receiving map data for a network of roads, where the map data includes data representing road segments within the network of roads; identifying road segments within the network of roads for which updated map data is needed; receiving an indication of generation of a route from an origin to a destination, where an alternative route is available that traverses at least one road segment for which updated map data is needed; generating an incentive for a user associated with the route that traverses at least one road segment for which updated map data is needed; providing an indication of the incentive to the user; and receiving probe data from a vehicle associated with the user having traversed the at least one road segment for which updated map data is needed.

20 Claims, 3 Drawing Sheets

(56) References Cited

U.S. PATENT DOCUMENTS

2016/0349067 A1    12/2016  Fowe
2018/0245929 A1*  8/2018  Watanabe ............... H04W 4/44

OTHER PUBLICATIONS

Cannella, C., *Behind Waze's Amibitious Plan to End Traffic for Good* [online] [retrieved Mar. 29, 2018]. Retrieved from the Internet: <http://marriott-hotels.marriott.com/innovation-issue/wazes-plan-to-end-traffic-for-good>. (Jul. 2017) 7 pages.

* cited by examiner

METHOD, APPARATUS, AND COMPUTER PROGRAM PRODUCT FOR INCENTIVIZING TRAVEL ALONG ROAD SEGMENTS

TECHNOLOGICAL FIELD

An example embodiment relates generally to the crowd sourcing map data and, more particularly, to incentivizing the traversal of road segments having a relatively low proportion of crowd sourced data.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle.

The probe data from vehicles traveling along the road segments may be used to inform map updates of road changes (e.g. properties of the road segment or a path of the road segment) and may inform traffic levels along the road segment. However, when probe data is sparse, data regarding the road segment may not be reliable.

BRIEF SUMMARY

A method, apparatus and computer program product are provided in accordance with an example embodiment in order to incentivize vehicle travel along road segments for which vehicle probe data is needed to update and enhance map data for a road network. Embodiments described herein may provide an apparatus including at least one processor and at least one non-transitory memory including program code instructions. The computer program code instructions may be configured to, when executed, cause the apparatus to: receive map data for a network of roads, where the map data includes data representing road segments within the network of roads; Identify road segments within the network of roads for which updated map data is needed; receive an indication of generation of a route from an origin to a destination, where an alternative route is available that traverses at least one road segment for which updated map data is needed, where the alternative route is not the fastest route or not the shortest route between the origin and the destination, nor optimal when measured along other user-specified pre-defined metrics; generate an incentive for a user associated with the route that traverses at least one road segment for which updated map data is needed; provide an indication of the incentive to the user; receive probe data from a vehicle associated with the user having traversed the at least one road segment for which updated map data is needed; and provide the incentive to the user.

According to some embodiments, the alternative route that traverses the at least one road segment for which updated map data is needed includes an estimate time of traversal within a predefined limit of the fastest route between the origin and the destination. The alternative route that traverses the at least one road segment for which updated map data is needed may include a distance within a predefined distance of the shortest route between the origin and the destination. Updated map data may be needed in response to map data for a road segment being older than a predetermined age. Updated map data may be needed in response to initial map data for a road segment indicating a change in the road segment relative to the existing map data for the road segment. The indication of generation of a route from an origin to a destination may be a ride share request from a user for a ride from the origin to the destination, where the incentive may include a lower cost or other measurable incentives to the user for traveling the route that traverses at least one road segment for which updated map data is needed. The indication of generation of a route from an origin to a destination may be a ride share request, where the user is a driver of a vehicle receiving the ride share request, and the incentive may include a higher rate paid to the user in response to traveling the route that traverses the at least one road segment for which updated map data is needed relative to other available routes.

Embodiments may provide a computer program product that includes at least one non-transitory computer-readable storage medium having computer-executable program code portions stored therein. The computer-executable program code portions including program code instructions configured to: receive map data for a network of roads, where the map data includes data representing road segments within the network of roads; identify road segments within the network of roads for which updated map data is needed; receive an indication of generation of a route from an origin to a destination, where an alternative route is available that traverses at least one road segment for which updated map data is needed, where the alternative route is not the fastest route or not the shortest route between the origin and the destination; generate an incentive for a user associated with the route that traverses the at least one road segment for which updated map data is needed; provide an indication of the incentive to the user; receive probe data from a vehicle associated with the user having traversed the at least one road segment for which updated map data is needed; and provide the incentive to the user.

According to some embodiments, the alternative route that traverses the at least one road segment for which updated map data is needed includes an estimated time of traversal within a predetermined limit of the fastest route between the origin and the destination. The alternative route that traverses the at least one road segment for which updated map data is needed includes a distance within a predefined distance of the shortest route between the origin and the destination. Update map data may be needed in response to map data for the road segment being older than a predetermined age. Map data may be needed for a road segment in response to initial vehicle probe data for the road segment indicating a change in the road segment relative to the existing map data for the road segment. The indication of the generation of a route from an origin to a destination may be a ride share request from a user for a ride from the origin to the destination, where the incentive may include a lower cost to the user for traveling the alternative route that traverses at least one road segment for which updated map data is needed relative to the shortest route or the fastest route. The indication of generation of a route from an origin to a destination may be a ride share request, where the user is a driver of a vehicle receiving the ride share request, where the incentive includes a higher rate paid to the user in response to traveling the alternative route that traverses the at least one road segment for which updated map data is needed relative to the shortest route or the fastest route.

Embodiments provided herein may include a method including: receiving map data for a network of roads, where the map data includes data representing road segments within the network of roads; identifying road segments within the network of roads for which updated map data is needed; receiving an indication of generation of a route from an origin to a destination, where an alternative route is available that traverses at least one road segment for which updated map data is needed, where the alternative route is not the fastest route or not the shortest route; generating an incentive for a user associated with the route that traverses at least one road segment for which updated map data is needed; providing an indication of the incentive to the user; receiving probe data from a vehicle associated with the user having traversed the at least one road segment for which updated map data is needed; and providing the incentive to the user.

According to some embodiments, the alternative route that traverses the at least one road segment for which updated map data is needed may include an estimated time of traversal within a predetermined limit of the fastest route between the origin and the destination. The alternative route that traverses the at least one road segment for which updated map data is needed may include a distance within a predefined distance of the shortest route between the origin and the destination. Updated map data may be needed in response to map data for a road segment being older than a predetermined age. Updated map data may be needed in response to initial vehicle probe data for a road segment indicating a change in the road segment relative to the existing map data for the road segment. The indication of generation of a route from an origin to a destination may be a ride share request from a user for a ride from the origin to the destination, where the incentive may include a lower cost to the user for traveling the route that traverses the at least one road segment for which updated map data is needed.

Embodiments provided herein may include an apparatus including: means for receiving map data for a network of roads, where the map data includes data representing road segments within the network of roads; means for identifying road segments within the network of roads for which updated map data is needed; means for receiving an indication of generation of a route from an origin to a destination, where an alternative route is available that traverses at least one road segment for which updated map data is needed, where the alternative route is not the fastest route or not the shortest route; means for generating an incentive for a user associated with the route that traverses at least one road segment for which updated map data is needed; means for providing an indication of the incentive to the user; receiving probe data from a vehicle associated with the user having traversed the at least one road segment for which updated map data is needed; and means for providing the incentive to the user.

According to some embodiments, the alternative route that traverses the at least one road segment for which updated map data is needed may include an estimated time of traversal within a predetermined limit of the fastest route between the origin and the destination. The alternative route that traverses the at least one road segment for which updated map data is needed may include a distance within a predefined distance of the shortest route between the origin and the destination. Updated map data may be needed in response to map data for a road segment being older than a predetermined age or tied to a pre-determined frequency of map updates. Updated map data may be needed in response to initial vehicle probe data for a road segment indicating a change in the road segment relative to the existing map data for the road segment. The indication of generation of a route from an origin to a destination may be a ride share request from a user for a ride from the origin to the destination, where the incentive may include a lower cost to the user for traveling the route that traverses the at least one road segment for which updated map data is needed.

BRIEF DESCRIPTION OF THE DRAWINGS

Figure 1:
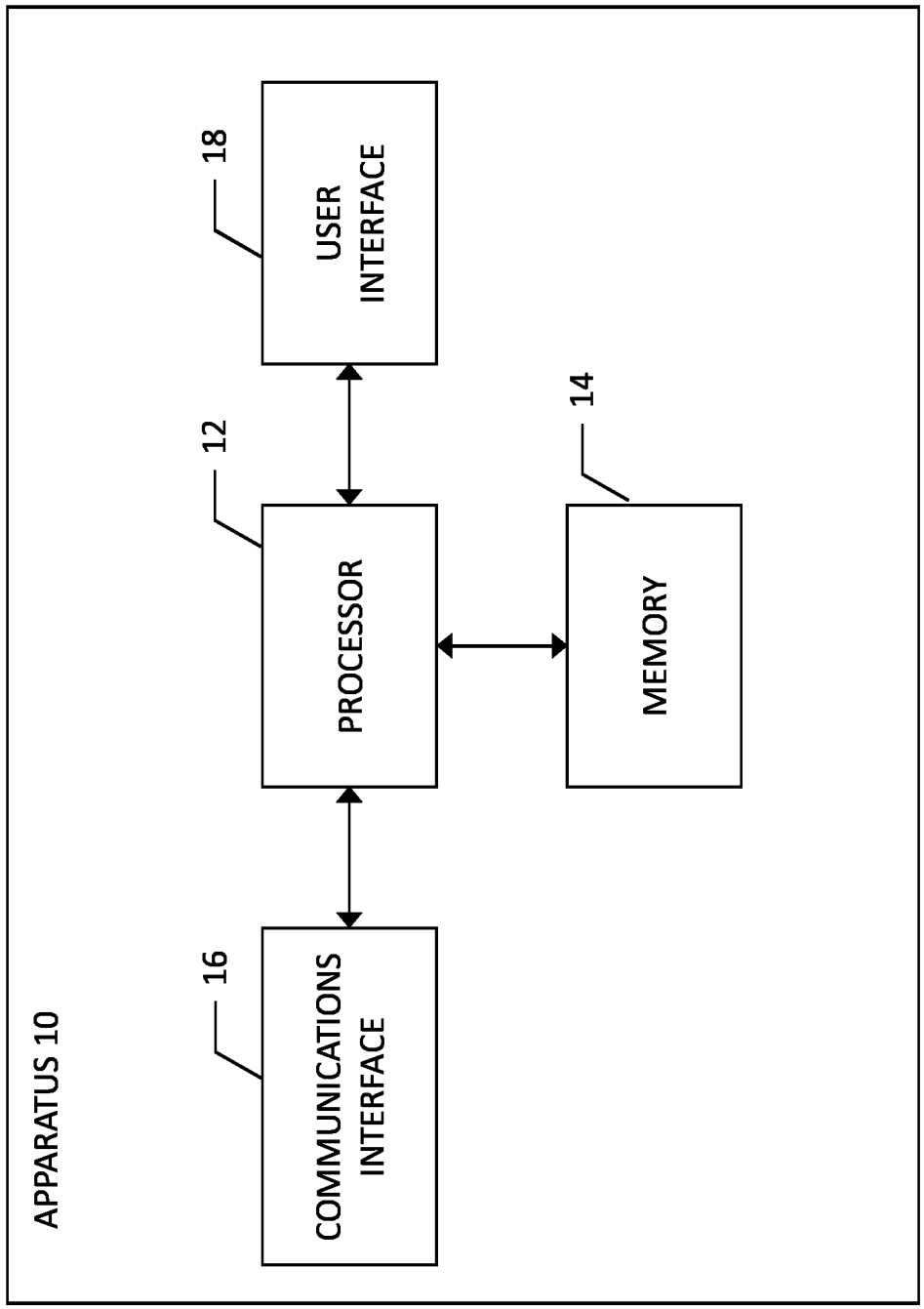
Figure 2:
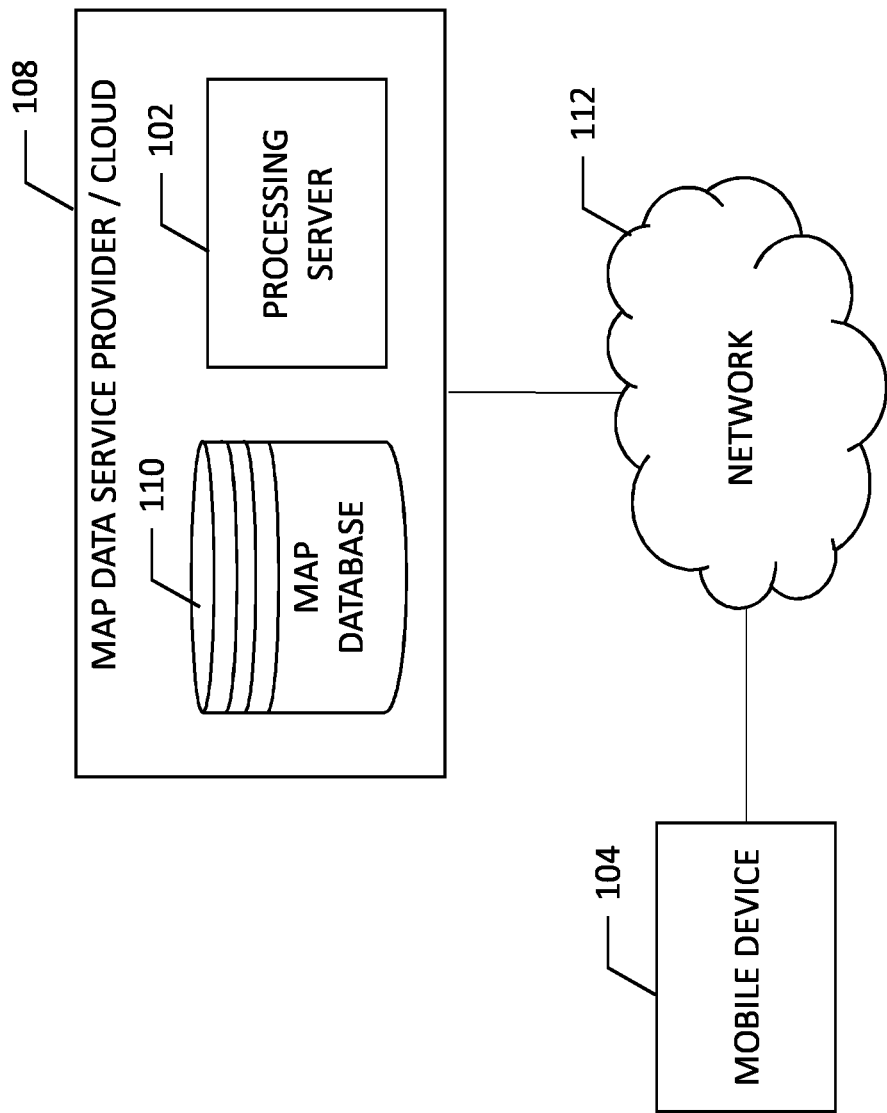
Figure 3:
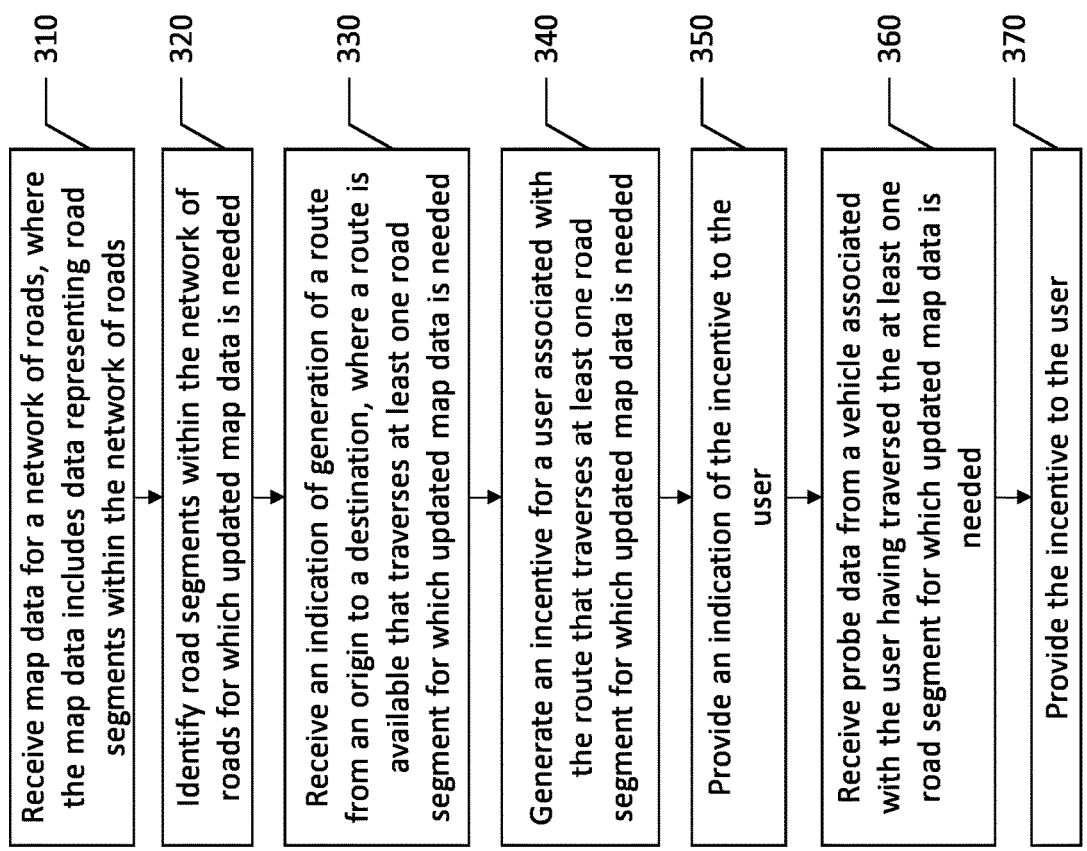

Having thus described certain example embodiments of the present disclosure in general terms, reference will hereinafter be made to the accompanying drawings, which are not necessarily drawn to scale, and wherein:

FIG. 1 is a block diagram of an apparatus according to an example embodiment of the present invention;

FIG. 2 is a block diagram of a system for incentivizing traversal of specific road segments according to an example embodiment of the present invention; and FIG. 3 is a flowchart illustrating the operations performed, such as by the apparatus of FIG. 1, in order to incentivize a user to traverse a road segment for which vehicle probe data is needed.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to use crowd-sourced probe data to provide map updates and to facilitate map construction. Vehicles equipped with sensors may drive along a road segment and produce probe data indicative of the road segment. Depending upon the capabilities of the sensors of the vehicle, data may include a path of the roadway, a travel speed along the roadway, imagery identifying signage along the roadway such as speed limits, stop signs, etc., distance sensors such as Light Imaging, Detection and Ranging (LIDAR) may provide locations and sizes of objects along a roadway, etc. In order to have sufficient coverage of geographic regions, road segments may require a plurality of probes to travel along a road segment in order to provide reliable data relating to the road segment. For example, due to inaccuracies in locationing mechanisms such as global positioning systems (GPS), the location identified by a vehicle probe along a road segment may actually be a location off of the road segment by several meters. Increasing the number of data points gathered by vehicle probes along a road segment mitigates errors in sensors such as GPS to achieve a more reliable crowd-sourced representation of the road segment and the data collected thereon. However, there are road segments that may have low traffic volumes and may be traversed by few appropriately-equipped vehicles such that vehicle probe sensor data for a road segment may be sparse and unreliable. Embodiments described herein remedy this issue through incentivizing travel along road segments that have sparse data in order to generate a more complete map of road segments in a geographic region with reliable data volumes, thereby improving the technology of digital map generation and maintenance which improves route guidance through navigation systems and autonomous or semi-autonomous vehicle control along the road network.

Embodiments described herein may use an apparatus to collect and send probe data to a map services provider which may, in turn, update map data according to the collected data. The apparatus may optionally benefit from the collection and providing of probe data to the map services provider as the apparatus of example embodiments may provide route guidance to a user and may facilitate autonomous or semi-autonomous vehicle control. Further, as embodiments described herein may provide an incentive for a user to traverse a particular route or road segment, an example apparatus may include a user interface that provides navigational assistance to a user to guide them along the incentivized route. The apparatus of an example embodiment may be embodied by a variety of computing devices including, for example, such as a navigation system, an advanced driver assistance system (ADAS), a GPS system or the like. Additionally or alternatively, the apparatus may be embodied in other types of computing devices, particularly when the calculation of a route an incentivizing thereof is performed outside of a mobile device or vehicle environment, such as a server, a personal computer, a computer workstation, a laptop computer, a plurality of networked computing devices or the like, that are configured to communicate with the map service provider as described herein. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a sensor or plurality of sensors, and provide said probe data to a database, cloud storage or other external memory device associated with the map services provider. The communication interface may be configured to receive data, such as from a map services provider including a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide navigational assistance or route guidance to a user based on data received from the map services provider. Further, the user interface 18 may communicate the incentive to a user to incentivize travel along the less traveled road segments to generate data for those road segments. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

In order for the map database 110 to be effective, the map database should include as much detail regarding all road segments within a network of roads in order to provide the most accurate and efficient routing of vehicles through the network of roads. However, issues exist with gathering probe data relating to road segments, particularly those less traveled. Some vehicles may not be equipped with sensors that are capable of providing vehicle probe data to map services providers, or users may not carry devices, such as mobile phones, that are capable of providing probe data to properly identify, map, and update road segments. Further, road segments that are rural or road segments that are of a lower road classification than an alternative road may not receive traffic sufficient to establish reliable map data. Thus, embodiments described herein provide incentives for vehicles having probe and sensor capabilities to traverse these road segments in order to provide reliable probe data for these road segments to the map service provider.

Road segments may require updated map data based on a variety of triggers. For example, the map data associated with a road segment may be old data, beyond a predetermined age. The map data may be deemed out of date by virtue of initial data from vehicles traveling along a road segment indicating that the road segment geometry has changed. For example, if a road path changes relative to the map data of the road segment, the first few vehicles that travel along that road segment that report probe data may report probe data that disagrees with the map data of the road segment. Such a disagreement may trigger a requirement for more vehicle probe data for the road segment. Optionally road data for a road segment may be updated on a periodic basis. The periodic update rate may be based on a standard update schedule for all road segments, or may be based on a classification of the road segment. For example, a rural road segment may be periodically updated annually, whereas a limited-access highway road segment may be updated weekly or monthly. According to example embodiments herein, a need for vehicle probe data for a road segment is determined by a map services provider such that vehicle probe data for that road segment is sought.

Once it is established that vehicle probe data for a road segment is desired or needed, embodiments described herein may seek such vehicle probe data. Optionally, a period of time may be afforded crowd-sourcing of vehicle probe data for a road segment before incentives for traversing the road segment begin to be offered. Embodiments described herein may monitor traffic levels along the road segment for a period of time, such as a week, month, etc. which may be based on the classification of the road segment, and upon not receiving sufficient vehicle probe data to provide reliable road segment data, an incentive operation may commence for the road segment.

Incentivizing vehicles to traverse a road segment may be performed in a number of ways. In an example embodiment of a user traveling proximate a road segment that requires updated vehicle probe data, an indication may be provided to the user, such as through a user interface of a navigation system. The indication may incentivize the driver to traverse the road segment through a variety of levels of incentives, which may depend upon how urgent the need is for updated vehicle probe data, or may depend upon the prior history of a user and what level of incentives have previously motivated a user to traverse a specific road segment. Further, the incentive may be based on how far out of a user's way they would have to go to reach the road segment for which updated vehicle probe data is needed. These incentives may be provided to a user as they are traveling with a known destination (e.g., during route guidance) or without a known destination (e.g., as a driver is traveling without route guidance).

If a user is preparing to navigate a route to a destination, or traveling along a route to a destination from an origin (which may be an initial origin of a route or the current location of a user), a route alternative may be provided to the user. The route alternative may be a route that traverses a road segment for which vehicle probe data is needed. If the route alternative is of an equal time or equal distance as the shortest available route, incentive may not be needed or offered, and the navigation system may simply provide a route through the road segment requiring updated vehicle probe data. However, if a shortest route to the destination, by time, distance, or both does not traverse the road segment for which vehicle probe data is needed, an incentive may be offered. The incentive may be commensurate with the amount of additional time or distance the user may need to spend in order to travel along the alternate route through the road segment for which vehicle probe data is needed. For example, if the alternative route is only an additional thirty second on a twenty minute route, the incentive may be relatively low. However, if the alternative route is an additional three minutes on a twenty minute route, the incentive may increase.

The degree to which the alternative route differs from a shortest route (by time, distance, or both) may be considered in determining whether to offer the alternative route to a user. For example, a threshold or predetermined distance above the shortest route may be established, above which an alternative route may not be offered. This distance may be a fixed distance, such as two miles, or a variable distance which varies based on the total length of the route. For a 100-mile route, a five-mile detour along an alternative route may not be appreciably different such that it is offered to the user. However, for a five-mile route, a half-mile detour may be established as the predetermined maximum detour length. Similarly, in a thirty minute route, a detour to an alternative route of two minutes may be acceptable, while in a five minute route, a detour to an alternative route may be limited to thirty seconds.

Incentives for a user may be in the form of premium access to an application, such as a mapping application or routing application. Incentives may be "badges" or virtual rewards offered within an application with which a user may compete with other users. Incentives may also be discounts offered to merchants that may partner with a map services provider. Incentives may be commercial free access to a music application that the user is listening to along their route. Incentives may be user dependent based upon the user preferences or a user history of accepted incentives. A user that has previously accepted an incentive of a discount coupon to a specific restaurant may respond positively to an incentive offered for that same restaurant. Incentives may be in the form of a points program, where points are earned and redeemed for incentives that a user selects from among an offered list of incentives. A points-based incentive may enable a map services provider to offer significant incentives when a user earns a substantial number of points. Incentives may also be contest entries, where earning the incentive provides an entry into a drawing from among others who earned the incentive.

Incentives may be provided for display to a user at the time a route is accepted, such as during route generation, whereas actually receiving the incentive may be predicated on the user traversing the road segment for which vehicle probe data is needed. Further, incentives may be communicated to a user audible as they travel to avoid visual distractions where appropriate.

Embodiments described herein may also be implemented in ride share scenarios. A user may request a ride from an origin to a destination from a ride share provider, and may be offered an alternative route to their destination that may take a longer time. This amount of time may be limited based on a percentage of the overall time of the journey, as described above. Optionally, whether in a ride share or navigation scenario, a user may define their threshold for distance or time deviation from a shortest route that they are willing to consider. A user of a ride share may be incentivized through the incentives described above, or may be incentivized based on a reduced rate that they may pay for the ride with the ride share. This instant benefit provided to a user may provide further incentive to a user in the form of a monetary savings that is a tangible benefit. Optionally, the incentive may be in the form of a discount on a future ride, which promotes the ride share business while also incentivizing the user to use the ride share again.

Optionally, in ride share scenarios that involve both a driver and a passenger (e.g., not in a fully autonomous scenario), the driver and the passenger may both be incentivized to travel an alternative route for probe data collection. In such a scenario, the driver or the passenger may be provided with the incentive and the alternative route or an indication of the delta between the optimal route and the alternative route. When the driver or the passenger approves the alternative route and indicates acceptance of an incentive, the other of the driver or the passenger must accept the alternative route in order for the alternative route to be followed and the incentives to be provided. The driver incentive may be a higher portion of the fare being passed along to the driver or credits may be provided to the driver's account. Similarly, a passenger incentive may be a lower rate or other incentive described above.

Embodiments may also be used to incentivize drivers of ride share vehicles. A driver may be presented with a request to transport a rider from an origin to a destination. An alternative route may be offered to the driver where the alternative route traverses a road segment for which vehicle probe data is needed. The driver may be incentivized by receiving a higher rate for the journey, which may be a higher percentage of the ride as reimbursed through their ride share company. The alternative routes provided to a driver of a ride share may be limited to a deviation from a shortest route of a relatively small amount of time or distance, as a rider may be aware that they are not traveling the shortest route. However, incentives may be offered to both the driver and the rider in a ride share scenario where both need to approve a deviation to an alternative route before that alternative route to a destination is used. In this manner, both the driver and the rider may be incentivized.

As described herein, embodiments provide a mechanism by which road segments for which vehicle probe data is needed may be traveled by vehicles in response to incentives offered. The incentivized alternative routes generated to incorporate road segments for which vehicle probe data is needed are generally not the fastest route between an origin and a destination, or they are not the shortest distance between the origin and the destination. An alternative route between an origin and a destination that is equally as short or equally as fast as the most optimal route may not require incentive, such that an alternative route may guide a user along a road segment for which vehicle probe data is needed without the user necessarily recognizing that they are on an alternative route. However, when an alternative route is not the fastest or not the shortest, provided the deviation from the fastest or shortest route is above a negligible or insignificant amount, incentives may be appropriate. The incentives may be provided ultimately by the map services provider who benefits from the collection of the road segment data. As such, the map services provider may provide incentives based on their evaluation of the necessity of vehicle probe data for a road segment, and how urgent the need is. Ultimately, the map service provider benefits from vehicle probe data that may have not otherwise been available, while users benefit from both the incentives and from fresher map data that provides a more accurate representation of the road segments in a road network and dynamic information relating to the road segments.

According to some embodiments, map data service providers 108 may use different forms of data for a variety of different purposes and may collect different types of data for road segments among the road network. For example, image data may be captured along a road segment to provide a visualization of the environment of the road segment. From this image data, road signs may be determined along with objects near or in the roadway. Other sensor data from probes may be acquired based on the sensors available, such as LiDAR (light distancing and ranging), image sensors, GPS, etc. Alternative routes with incentives may be selectively offered only to those vehicles that have the capabilities to acquire the data needed for the road segment. This may promote only the necessary data being incentivized and gathered.

FIG. 3 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

According to the example embodiment of FIG. 3, map data for a network of roads is received at 310, where the map data includes data representing road segments within the network of roads. At 320, road segments within the network of roads for which updated map data is needed are identified. An indication of generation of a route from an origin to a destination is received at 330, where an alternative route is available that traverses at least one road segment for which updated map data is needed. The alternative route is not the shortest route or is not the fastest route. An incentive is generated for a user at 340 that is associated with the route that traverses at least one road segment for which updated map data is needed. An indication of the incentive is provided to the user at 350. Probe data from a vehicle associated with the user having traversed that least one road segment for which updated map data is needed may be received at 360, confirming the user has provided the vehicle probe data, such that the incentive is provided to the user at 370.

In an example embodiment, an apparatus for performing the method of FIG. 3 above may comprise a processor (e.g., the processor 12) configured to perform some or each of the operations (310-370) described above. The processor may, for example, be configured to perform the operations (310-370) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-370 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus including at least one processor and at least one non-transitory memory including computer program code instructions, the computer program code instructions configured to, when executed, cause the apparatus to at least:
receive map data for a network of roads, wherein the map data comprises data representing road segments within the network of roads stored in a database;

identify road segments within the network of roads for which updated map data is needed;

receive an indication of generation of a route from an origin to a destination, wherein an alternative route is available that traverses at least one road segment for which updated map data is needed, wherein the alternative route is not the fastest route or not the shortest route between the origin and the destination, and wherein the alternative route that traverses the at least one road segment for which updated map data is needed comprises an estimated time of traversal within a predefined limit of the fastest route between the origin and the destination;

generate an incentive for a user associated with the alternative route that traverses at least one road segment for which updated map data is needed;

provide an indication of the incentive to the user;

receive probe data from a vehicle associated with the user having traversed the at least one road segment for which updated map data is needed;

update the map data for the network of roads in the map database with the probe data from the vehicle associated with the user having traversed the at least one road segment for which updated map data is needed; and provide the incentive to the user.

2. The apparatus of claim 1, wherein the alternative route that traverses the at least one road segment for which updated map data is needed comprises a distance within a predefined distance of the shortest route between the origin and the destination.

3. The apparatus of claim 1, wherein updated map data is needed in response to map data for a road segment being older than a predetermined age.

4. The apparatus of claim 1, wherein updated map data is needed in response to initial vehicle probe data for a road segment indicating a change in the road segment relative to existing map data for the road segment.

5. The apparatus of claim 1, wherein the indication of generation of a route from an origin to a destination is a ride share request from a user for a ride from the origin to the destination, wherein the incentive comprises a lower cost to the user for traveling the alternative route that traverses the at least one road segment for which updated map data is needed relative to the shortest route or the fastest route.

6. The apparatus of claim 1, wherein the indication of generation of a route from an origin to a destination is a ride share request, wherein the user is a driver of a vehicle receiving the ride share request, and wherein the incentive comprises a higher rate paid to the user in response to traveling the alternative route that traverses the at least one road segment for which updated map data is needed relative to the shortest route or the fastest route.

7. A computer program product comprising at least one non-transitory computer-readable storage medium having computer-executable program code portions stored therein, the computer-executable program code portions comprising program code instructions configured to:

receive map data for a network of roads, wherein the map data comprises data representing road segments within the network of roads stored in a database;

identify road segments within the network of roads for which updated map data is needed;

receive an indication of generation of a route from an origin to a destination, wherein an alternative route is available that traverses at least one road segment for which updated map data is needed, wherein the alternative route is not the fastest route or not the shortest route, and wherein the alternative route that traverses the at least one road segment for which updated map data is needed comprises an estimated time of traversal within a predefined limit of the fastest route between the origin and the destination;

generate an incentive for a user associated with the alternative route that traverses at least one road segment for which updated map data is needed;

provide an indication of the incentive to the user;

receive probe data from a vehicle associated with the user having traversed the at least one road segment for which updated map data is needed;

update the map data for the network of roads in the map database with the probe data from the vehicle associated with the user having traversed the at least one road segment for which updated map data is needed; and provide the incentive to the user.

8. The computer program product of claim 7, wherein the alternative route that traverses the at least one road segment for which updated map data is needed comprises a distance within a predefined distance of the shortest route between the origin and the destination.

9. The computer program product of claim 7, wherein updated map data is needed in response to map data for a road segment being older than a predetermined age.

10. The computer program product of claim 7, wherein updated map data is needed in response to initial vehicle probe data for a road segment indicating a change in the road segment relative to existing map data for the road segment.

11. The computer program product of claim 7, wherein the indication of generation of a route from an origin to a destination is a ride share request from a user for a ride from the origin to the destination, wherein the incentive comprises a lower cost to the user for traveling the alternative route that traverses at least one road segment for which updated map data is needed relative to the shortest route or the fastest route.

12. The computer program product of claim 7, wherein the indication of generation of a route from an origin to a destination is a ride share request, wherein the user is a driver of a vehicle receiving the ride share request, and wherein the incentive comprises a higher rate paid to the user in response to traveling the alternative route that traverses the at least one road segment for which updated map data is needed relative to the shortest route or the fastest route.

13. A method comprising:

receiving map data for a network of roads, wherein the map data comprises data representing road segments within the network of roads stored in a database;

identifying road segments within the network of roads for which updated map data is needed;

receiving an indication of generation of a route from an origin to a destination, wherein an alternative route is available that traverses at least one road segment for which updated map data is needed, wherein the alternative route is not the fastest route or not the shortest route between the origin and the destination, and wherein the alternative route that traverses the at least one road segment for which updated map data is needed comprises an estimated time of traversal within a predefined limit of the fastest route between the origin and the destination;

generating an incentive for a user associated with the route that traverses at least one road segment for which updated map data is needed;

providing an indication of the incentive to the user;

receiving probe data from a vehicle associated with the user having traversed the at least one road segment for which updated map data is needed;

updating the map data for the network of roads in the map database with the probe data from the vehicle associated with the user having traversed the at least one road segment for which updated map data is needed; and providing the incentive to the user.

14. The method of claim 13, wherein the alternative route that traverses the at least one road segment for which updated map data is needed comprises a distance within a predefined distance of the shortest route between the origin and the destination.

15. The method of claim 13, wherein updated map data is needed in response to map data for a road segment being older than a predetermined age.

16. The method of claim 13, wherein updated map data is needed in response to initial vehicle probe data for a road segment indicating a change in the road segment relative to existing map data for the road segment.

17. The method of claim 13, wherein the indication of generation of a route from an origin to a destination is a ride share request from a user for a ride from the origin to the destination, wherein the incentive comprises a lower cost to the user for traveling the route that traverses the at least one road segment for which updated map data is needed.

18. The method of claim 13, wherein the indication of generation of a route from an origin to a destination is a ride share request, wherein the user is a driver of a vehicle receiving the ride share request, and wherein the incentive comprises a higher rate paid to the user in response to traveling the alternative route that traverses the at least one road segment for which updated map data is needed relative to the shortest route or the fastest route.

19. The method of claim 13, wherein generating an incentive for a user associated with the route that traverses at least one road segment for which updated map data is needed comprises:

generating an incentive for a user associated with the route that traverses at least one road segment based on an urgency with which updated map data is needed for the at least one road segment.

20. The method of claim 13, wherein generating an incentive for a user associated with the route that traverses at least one road segment for which updated map data is needed comprises:

generating an incentive for a user associated with the route that traverses at least one road segment based on a time delay associated with the route that traverses the at least one road segment relative to the fastest route.

* * * * *